June 2, 1970     H. B. THOMPSON     3,515,886

MICROFICHE RETRIEVAL UNIT WITH SOLENOID FILM FILTER

Filed Nov. 29, 1967     4 Sheets-Sheet 1

INVENTOR.
HAROLD B. THOMPSON
BY Harry A. Herbert Jr.
Charles H. Wagner
ATTORNEYS

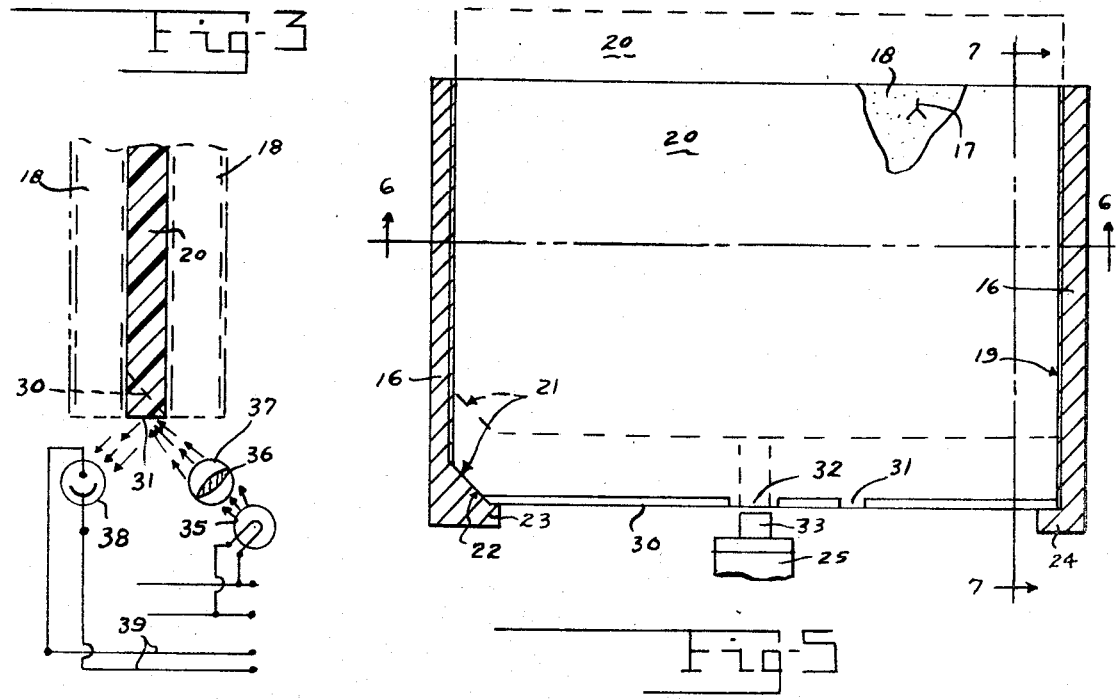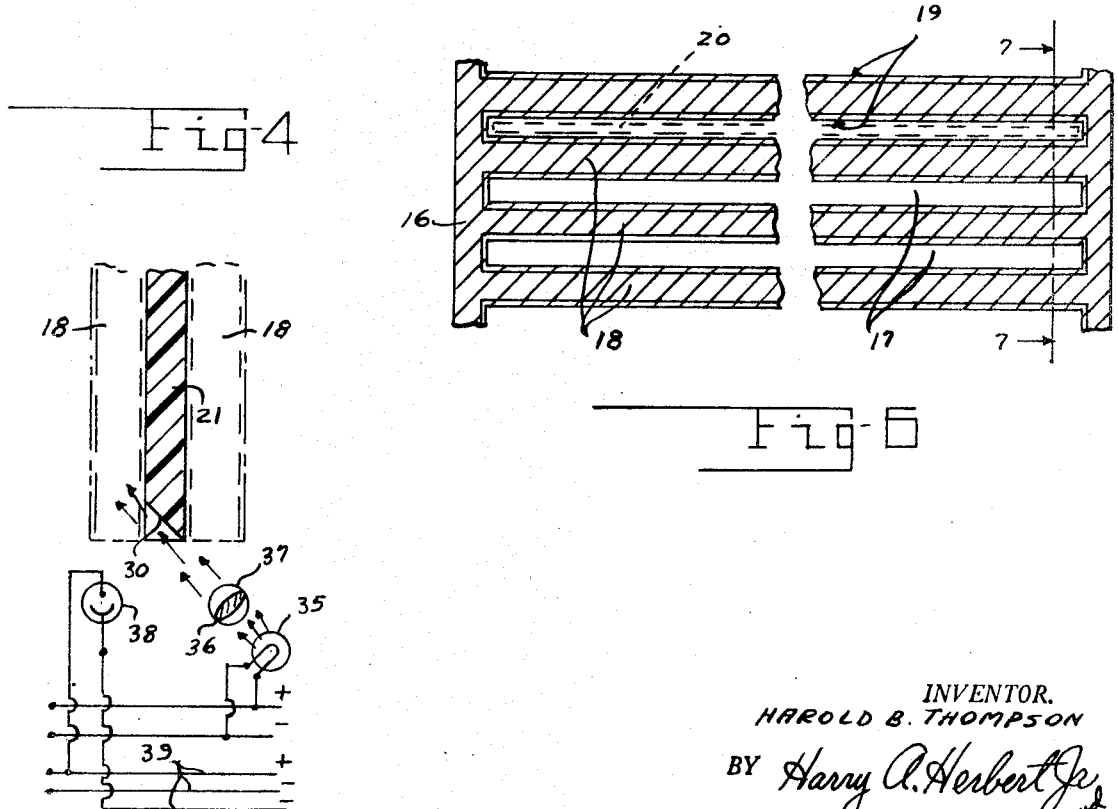

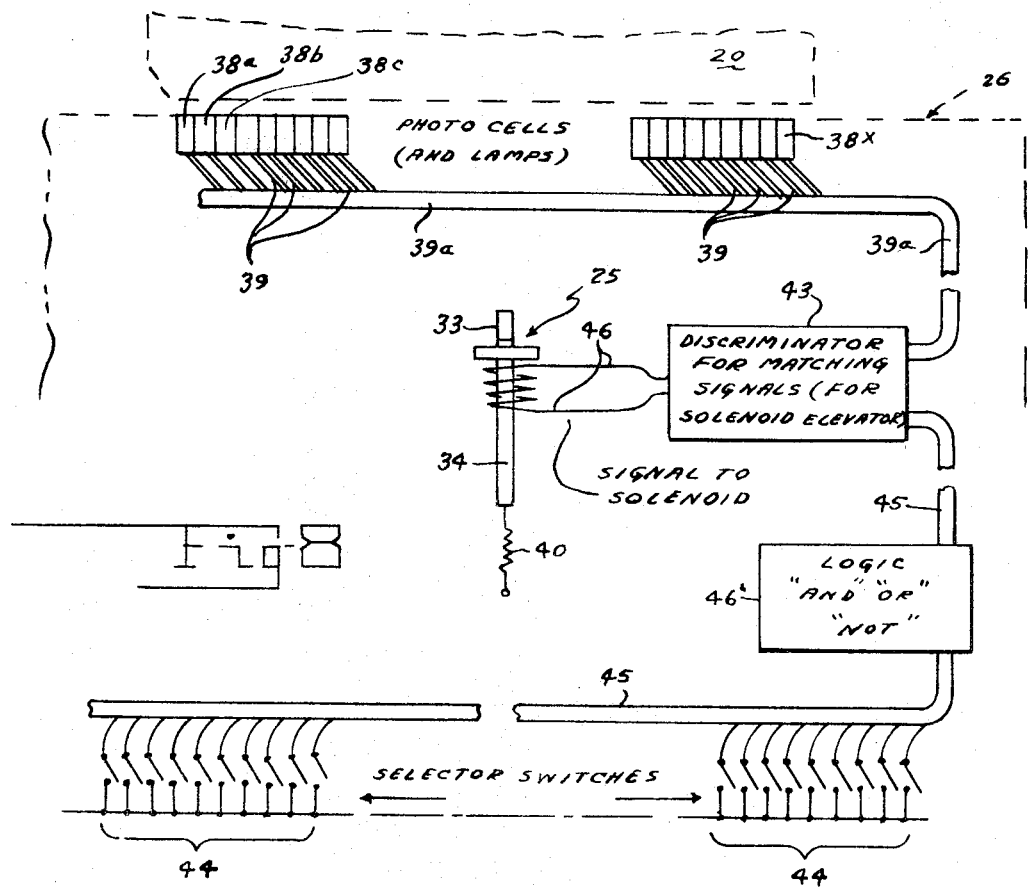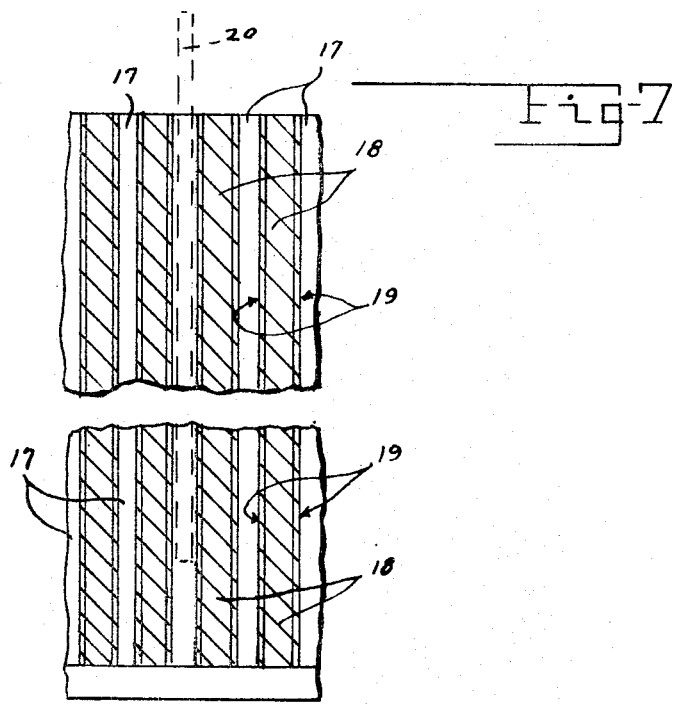

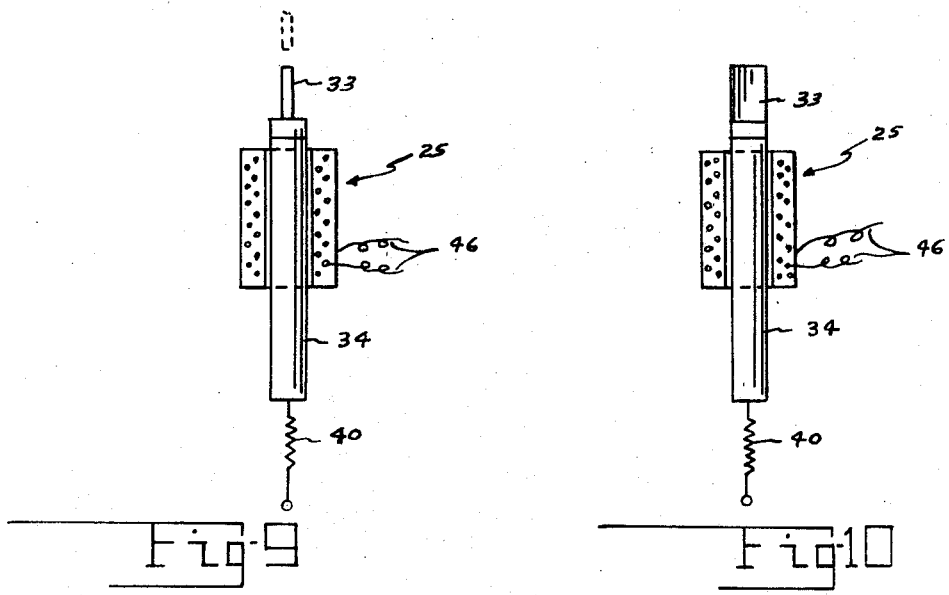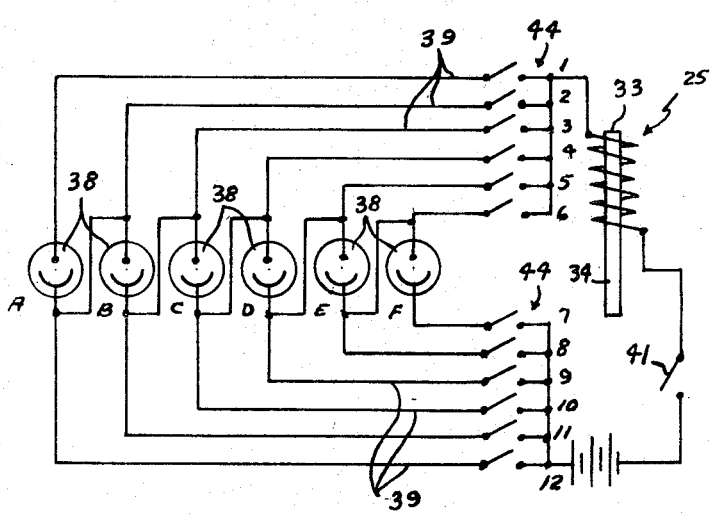

United States Patent Office 3,515,886
Patented June 2, 1970

3,515,886
MICROFICHE RETRIEVAL UNIT WITH SOLENOID FILM FILTER
Harold B. Thompson, 8901 Wicklow Ave., Cincinnati, Ohio 45236
Filed Nov. 29, 1967, Ser. No. 686,597
Int. Cl. G06k 7/10
U.S. Cl. 250—219      8 Claims

ABSTRACT OF THE DISCLOSURE

A storage and retrieval unit and system for "microfiche" and thin films of uniform size, shape, and thickness having a drawer like container partitioned uniformly throughout its length for storing "microfiche" films in closely spaced identical parallel relation. A solenoid film lifter is fixedly disposed below the center line of the container with a "push up" blade which elevates a selected film sheet for removal or inspection in its storage slot as the container is moved longitudinally thereover. The lower edge of each "microfiche" (film) is beveled, with one end corner angularly cut which engages camming means in the side of the container to move all of the film endwise during insertion to identical positions and orientation in the partitions in the container. The lower beveled edge of each film is interrupted with "coated" short non-beveled flat reflective portions located at different predetermined longitudinal positions along the beveled edges. These "coded" portions are flat and normal to the plane of the film and preferably made highly reflective. A "reading head" contains a light source relatively fixed below the container to project a upwardly inclined light beam toward the beveled edge of each film successively as the container is moved outwardly over the "reading head" normal to the planes of the films. A plurality of photocells in the "reading head" are disposed to selectively receive the reflected light beam from the reflective flat edge portions on the beveled bottom edge of the films to selectively energize the photocells. Selector switch means are provided which connect a selected photocell or group of photocells (when energized by the reflected light beam or beams) which operates the film lifter solenoid to actuate the "lifter" blade to raise the selected "microfiche" film in its slot for inspection, or for removal from its storage slot as the selected short flat reflective portions on the beveled bottom edges of the films pass through the projected light beam or beams. Spring means quickly withdraw the plunger after projection, as the light beam passes off of the short reflective flat "coded" portion on the bottom edge of the film as the container is pulled outwardly past the "reading head," for instance, like a drawer in a card filing cabinet.

BACKGROUND AND SUMMARY OF THE INVENTION

The invention relates to means for storage and electronic or photo-electronic selection of sheet film material such as "microfiche" stored in filing containers by means of scanning of coded edge portions of the film to elevate the selected film sheet above the other sheets in a container by scanning the lower edge of the sheet during movement of the container over a scanning head or selector, and has for an object the provision of reflecting and non-reflecting bits located on the bottom edge of "microfiche" film to provide signals which are electronically compared with a desired preset pattern to raise the selected film sheets out from between spaced non-selected sheets disposed in a movable container in closely spaced identical parallel and oriented positions where they can be removed for further inspection more quickly and cheaply than other computers or devices using film on reels.

A further object comprises coding the bottom edges of "microfiche" film of relatively high density in which the coding is sensed and interpreted electronically, having for a further object the concept of retrieval of desired flat film documents by a one step process to reduce the elapsed time for identification of desired documents, also reducing the cost of the required equipment below that of conventional selective equipment while obtaining better, quicker, and more accurate and efficient selection and removal of stacked parallel closely spaced identical size, shape, film sheets than presently known document sheet retrieval units and systems presently in use at this time.

Other objects and advantages of the invention will become apparent from the following description and accompanying drawings in which like reference characters refer to like parts on the several figures.

BRIEF DESCRIPTION OF THE DRAWINGS

FIGS. 3 and 4 are much enlarged detail sectional views taken about on the planes indicated by lines 3—3 and 4—4 respectively in FIG. 2, more clearly showing the photoelectric film selector actuating means in the "reader head."

FIG. 5 is a fragmentary transverse sectional view through one of the drawer like "microfiche" film storage and retrieval slots or compartments in the container with one of the films therein, shown in full lines, and raised for removal in dotted lines.

FIG. 6 is a greatly enlarged fragmentary horizontal sectional view, taken about on line 6—6 in FIG. 5.

FIG. 7 is a similar fragmentary sectional view taken about on line 7—7 in FIGS. 5 or 6, showing one of the selected films raised in dotted lines.

FIG. 8 is a schematic diagram of one form of the film storage and selection device and system, showing diagrammatically the photocell film selector units and solenoid lifter unit which is located in the "reader head" and some of the selector switches for selectively controlling certain energizing circuits which are energized by the photoelectric selector means in the "reader head."

FIGS. 9 and 10 are detailed longitudinal sectional views through the solenoid actuated lifter means, taken at right angles to each other.

FIG. 11 is a schematic view showing a few of the photocells and selector switch means therefor for conditioning a predetermined one or more of the photocells to selectively control the energizing circuit to the lifter solenoid, when a selected one or more predetermined photocells are energized by the light beam or beams reflected by the short flat reflective surface or surfaces which are located at predetermined positions along the beveled lower edge of the microfiche films. "Microfiche" are sections of films on which printed material is photographed in greatly reduced size. "Microfiche" are usually 105 mm. by 148 mm. in size and may contain between 58 or 70 pages of information or data. The thickness on the bottom and both edges is usually slightly less than .008 inch.

DESCRIPTION OF THE PREFERRED EMBODIMENT

Figure 1:
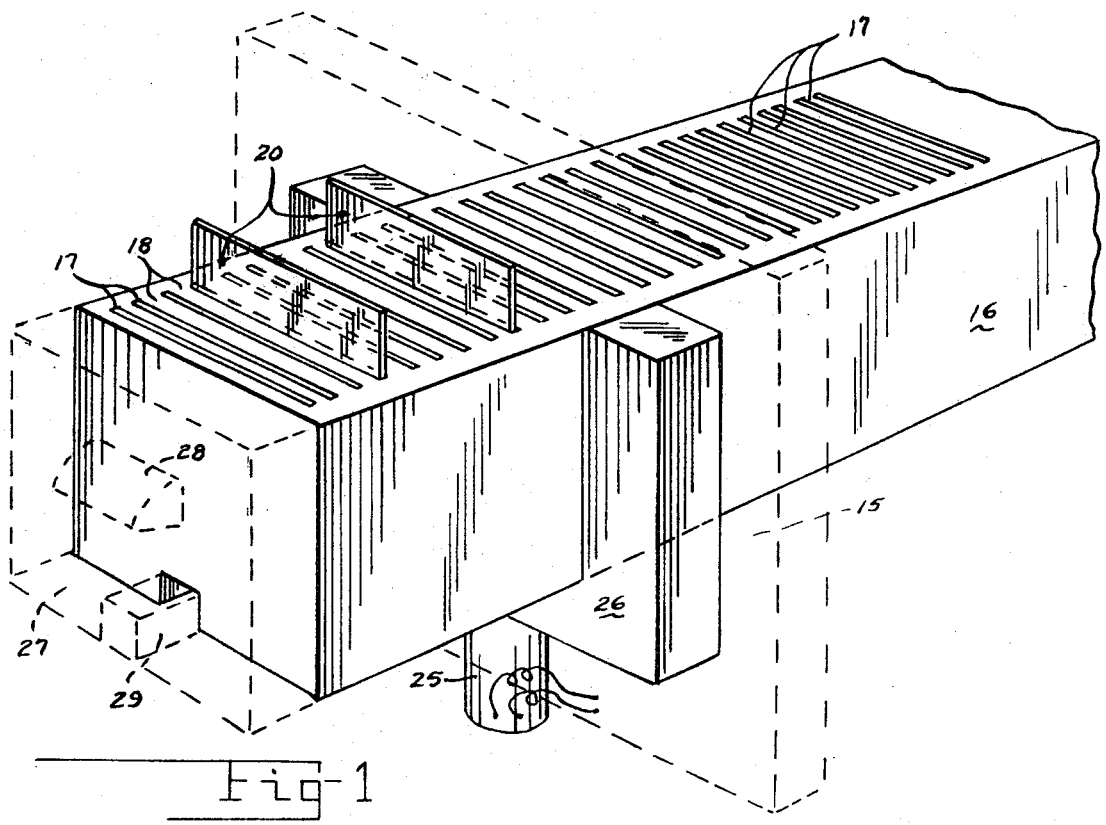
FIG. 1 is a perspective view somewhat schematically showing a drawer like container partly withdrawn from a cabinet, in which the front of the cabinet is shown in dotted lines with a "scanning" or "reading" head fixed in partly surrounding relation against the front of the cabinet, also showing two of the "microfiche" films selected and elevated above the remaining stored films in the drawer like container.

Referring to FIG. 1 the reference numeral 15 denotes the front of a suitable storage cabinet in which one or more of the "microfiche" storage containers 16 of drawer like construction are slidably mounted for outward and inward movements. The drawers or containers 16 are each provided with a plurality of closely spaced parallel microfiche sheets or film receiving slots 17 with partition portions or webs 18 therebetween.

The individual slots 17 in the drawer 16 are provided with "flocking" or padding 19 to prevent the films from being scratched, and to hold the films firmly in position.

The lower edge of each sheet of microfiche indicated at 20 has a similar corner 21 clipped or angled to provide a camming surface for engagement with an inclined cam surface 22 at the side of the bottom of its receiving slot 17 for the purpose of camming each sheet of the film 20 against the opposite side of the slot 17 in the precise or exact position in the slot and also provide proper "orientation" of each film 20 in the drawer 16. The length of the slots 17 are preferably only slightly longer than the films so that the film can be slid down freely but snugly against the bottom flanges 23 and 24, but still remain elevated when lifted upwardly by the lifter solenoid 25, and held elevated by the soft padding 19. If desired, separate friction means (not shown) may be provided to prevent the raised film 20 from dropping by gravity.

Figure 2:
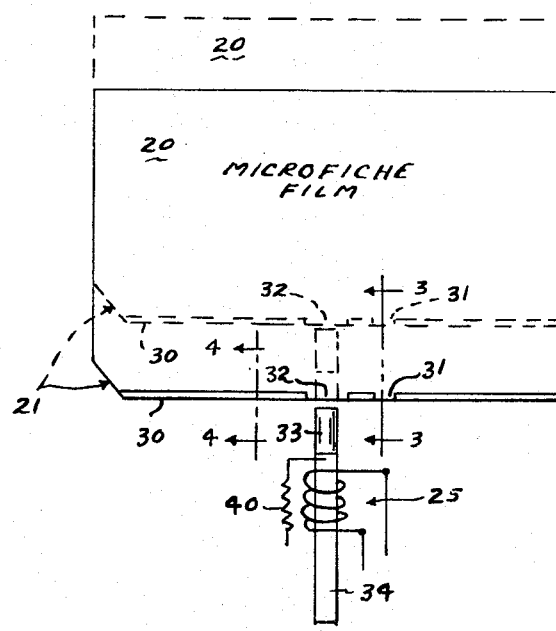
FIG. 2 is a somewhat diagrammatic elevational view showing the solenoid actuator and film elevating, or lifter means, with one of the "microfiche" films in non-elevated position in full lines, and in elevated position in dotted lines.

A "reading head" is provided, indicated generally at 26 which is preferably fixed at the front of the cabinet 15 and closely surrounds both sides and bottom of the drawer or container 16 and has photo-electric scanning means therein which scans the entire length of the bottom edge of each microfiche film 20 through the bottom of the drawer 16 between the supporting flanges 23 and 24 as the drawer is pulled outwardly in the cabinet 15 as seen in FIG. 1. The drawer may have a solid front portion 27 with a drawer pull 28 to allow the front located films 20 in the drawer 16 to pass inwardly past the reading head 26. Also the bottom of 27 is notched at 29 to accommodate the passage of the solenoid lifter 25 therethrough as the drawer 16 is closed or opened. Referring more particularly to FIGS. 2, 3 and 4, the bottom edge of each of the films 20 is beveled, as indicated at 30, with predetermined short flat or non-beveled reflective portions 31 located in predetermined "coded" positions in the length of the bottom edge of the films 16, also a substantial unbeveled central portion 32 is provided for lifting engagement therewith of the top of a lifter blade 33 fixed at the upper end of the armature 34 of the lifter solenoid 25.

The bottoms of the short flat interrupted portions 31 are preferably made highly reflective and normal to the plane of the films 20.

Located in the reading head 26 is a light projecting and lens system including a lamp or lamps 35 and lens 36 which projects a light beam 37 upwardly at an angle in a plane normal to the plane of the film to form a converging beam in the plane at the bottom of the flat portions of the films, as the drawer 16 is moved outwardly in the cabinet 15.

Located in the "reading head" 26, normal to and below the films 20 are a plurality of photocells 38, each disposed to receive the light beam or beams 37 reflected by the bottom of one of the short flat reflective surfaces 31 (in the plane normal to the plane of the films 20).

As the drawer 16 is moved outwardly across the reading head 26, the light beam or beams 37 that are reflected by the short flat reflecting surfaces 31 on the film 20 strike the corresponding photocells 38 located in the planes passing through the reflecting surfaces 31. Any particular circuit that is closed to include the particular photocell will thus be energized. These circuits can be selectively connected to include, or exclude, certain of the photocells 36, as seen schematically in FIG. 11 to provide different predetermined combinations and coded selective circuits 39 which are or may be energized by the selected photocells and selectively connected to the film lifter solenoid 25 to elevate a predetermined "microfiche" film 20 above the top level of the drawer 16, as seen in FIG. 1 and dotted in FIGS. 2 and 5. Since the film elevator blade 33 fixed on the solenoid armature 34 must be quickly retracted out of the way during movement of the drawer 16 when the light beam 37 passes off of the "coded" flat reflective bits 31 and the lifting circuit 39 is broken, a suitable retractor spring 40 may be provided to snap the solenoid armature 34 down out of the way to prevent interference to the outward (or inward) movement of the drawer 16.

The light beam portions 37 which fail to strike the short reflective portions (as seen in FIG. 4) of course do not strike or energize the opposite photocells 38, because they pass by the beveled bottom edge portions 30 of the films 20.

Referring to FIG. 11, diagrammatically showing a few of the photocells 38 and selector switches, it will be seen that with switches 1 and 12 closed only the photocell A will energize the solenoid 25. With switches 4 and 12 closed only the combination of photocells 38 indicated at A, B and C will energize the lifter solenoid 25, while with the switches 7 and 6 closed, only the photocell F, when energized will close the circuit to energize and operate the lifter solenoid 25. The manipulation of the selective control switches 1 to 6, and 7 to 8 provide a coded preselection means for selecting and elevating the "microfiche" in the drawer 16, according to the locations of the short flat reflective surfaces 31 on the beveled lower edges 30 of the films 20.

The selector circuit 39 may include a switch 41 opened either manually (or automatically) after one of the drawers 16 is pulled outwardly to successively expose all of the "microfiche" films to the selector means in the reading head 26, so as to interrupt the circuit to the lifter solenoid 25, so that when the films 20 are replaced or pushed down, the closing movement of the drawer 16 will not permit the device to function to again raise any of the "microfiche" films 20 during the closing of the drawer or drawers 16.

Referring briefly to the schematic diagram in FIG. 8 each reader head 26 contains a row of successively spaced photocell units 38a, 38b, 38c . . . 38x, etc., each positioned to receive the reflected light or electric beam from one of a corresponding number of the short flat reflective "bits" 31 which are selectively located on the lower edge of the "microfiche" films 20.

The beam or beams 37 of course is (are) not reflected to the photocells 38 by the beveled portions 30 of the edges of the films 20. The electrical circuit conductors 39 lead through a collector sheath 39a into a discriminating unit 43. The "microfiche" selector switches 44 also lead through the circuit 45 to the discriminator unit 43 where, in any well-known manner, certain of the selector switches 44 (somewhat like in FIG. 11) connect one or more of predetermined photocells 38 in circuit to the solenoid film lifter means 25 when the photocells 38 that are selected (in series) are energized by the calculated reflected light beam or beams 37 from the desired reflective bits 31 on the bottom edge of the film, or films 20.

When the desired combination of photocells 38a, 38b and 38c is energized through the signal discriminator 43 the circuit 46 to the lifter solenoid 25 is energized (momentarily) as the film 20 passes the reading head 26 and the lifter solenoid 25 is (momentarily) energized and then retracted out of the way, preferably by a spring, such as 40, so as not to interfere with the movement of the drawer 16 by the thin film lifter blade 33 on the core 34 of the solenoid 25.

If desired a logic "and/or, not" control unit 46' may be inserted in the circuit from the switches 44 to the discriminator unit 43. This may also contain the interrupter switch means 41 above mentioned, as well as means for selectively "cutting out" certain predetermined circuits to certain of the photocells, if desired.

Briefly describing the operation of the device, any "coded" selector switch 44 is closed, which through the discriminator 43 sets up one or more circuits through predetermined photocells 38 and when the drawer 16 is pulled out the flat reflected bits on certain of the lower edges of the "microfiche" film in the selected circuits to the photocells closes the circuits to the lifter solenoid as the films 20 pass over the lifter blade 33 and the core 34 engages the center of the lower edge of the film to raise the film upwardly in the storage slot 17 in which it is located above the rest of the films in the drawer, as seen in FIG. 1.

The "microfiche" can be withdrawn if desired or pushed back in its slot or returned to any slot 17 since the particular location of the film in the drawer is not necessarily important. After the drawer or container is ready for its return, it is preferably desirable to have the circuits to the photocells open so that no film will be elevated during this return movement, by opening a swtich, such as the switch 41 which can easily be made to open by return movement or close by outward movement of each drawer 16. While a photoelectric selector system is shown as a preferred selector system other types of film selector systems may be used. However for purposes of exemplification, a particular embodiment of the invention has been shown and described to the best understanding thereof and it will be apparent that changes and modifications in the arrangement and construction of the parts thereof may be resorted to without departure from the true spirit and scope of the invention as defined in the following claims.

I claim:

1. A microfiche film storage and retrieval unit comprising, an elongated longitudinally movable container having a longitudinal axis and an open bottom and partitioned transversely to individually receive and store flat sheets of microfiche films therein in closely spaced identically oriented positions in separate parallel planes normal to the longitudinal axis of said movable container, a fixed reading head extending closely adjacent the movable container transverse to the said longitudinal axis thereof and below the top surface thereof, traversed by longitudinal movement of said container, selectively energized microfiche film lifting solenoid means fixed below said movable container to said reading head or limited upward movement toward the bottom of the container, microfiche film lifting blade means fixed thereto, to selectively move upwardly through the open bottom of the container to engage the lower edge of any selected microfiche film in said container between said partitions when moved by said container into position directly above said film lifting blade means when said film lifting solenoid means is energized, to elevate the selected microfiche film in said container above the top of other microfiche films in the movable container for inspection or removal above the other microfiche films therein, spring means connected to said solenoid lifting means for retracting said film lifting blade means out of the path of movement of said container after said selected film has been raised and moved by said container out of lifting position above said lifting blade means, cooperating plural microfiche film selector means in said reading head and fixed in predetermined different positions along the lower edge of each of said microfiche films for selectively energizing said lifting solenoid means to raise said lifting blade means when a predetermined selected microfiche film in between said partitions in said container is moved into a lifting position dirctly above said film lifting blade means.

2. A microfiche film storage and retrieval unit comprising, an elongated longitudinally movable open bottom container having closely spaced transverse partitions with intermediate film receiving slots positioned in closely spaced parallel relation to receive and store a flat sheet of microfiche films separately in each of the spaces between said partitions in identically oriented separate positions in parallel planes normal to the longitudinal axis and movement of said movable container, a fixed reading head extending across the bottom below the container transversely to the longitudinal axis thereof, and traversed by longitudinal movement of said container above said reading head, selectively energized microfiche film lifting means fixed to said reading head below said movable container for limited upward movement toward the bottom of said container, microfiche film lifting blade means fixed to the upper end of said lifting means to enter the slots between said partitions to engage the lower edge of any selected microfiche film after movement of said film by said movable container into position, directly above said film lifting blade means when said film lifting blade means is energized, to elevate the selected microfiche film engaged by said lifting blade means above the other microfiche films therein, spring means connected to said lifting means for retracting said film lifting blade means downwardly out of the path of movement of said container and any microfiche film stored therein after said lifting means has been released by movement of said microfiche film out of a position directly above said film lifting blade means, cooperating plural microfiche film selector means fixed in said reading head and in predetermined different longitudinal positions along the longitudinal lower edges of said microfiche films for selectively energizing said film lifter means to raise said lifting blade means into lifting engagement with the lower edge of a predetermined selected microfiche film in said container when moved into position directly above said film lifting blade means in cooperative registration with predetermined cooperating microfiche film selector means in said reading head.

3. A microfiche film storage and retrieval device comprising an elongated longitudinally movable container having a longitudinal axis and an open bottom with inturned, longitudinal side flanges for supporting the opposite ends of the lower edges of each of the microfiche films, said container having closely spaced parallel partitions transversely fixed therein to provide transverse film receiving spaces in predetermined similar spaced relation, a reading head, plural selector means fixed in said reading head, film shifting means on one side of the container between each of said partitions for engaging and moving the microfiche films, when inserted in said film receiving spaces, toward the other end of said film receiving spaces, to move all of the films inserted in the container into identical relation to the longitudinal axis of the container for selective registration with said plural selector means, during longitudinal movement of said container through said reading head, film lifting means fixed to said reading head under said container comprising solenoid means disposed in a vertical plane below the bottom edges of the microfiche films, said solenoid means having core means movable upwardly toward the bottom of said container upon energization thereof, lifting blade means fixed to the upper end of said core means in a vertical plane transverse to the longitudinal movement of said container, said blade means having a predetermined thickness for entering said film receiving space between any of the partitions and at least as thick as said microfiche film, for lifting engagement with the bottom edge of any selected microfiche film in said movable container when said solenoid means is energized, and spring means connected to said core means for retracting the same and blade means out of the path of movement of said container when said solenoid means is de-energized.

4. A microfiche film storage and retrieval unit as set forth in claim 3 including friction means in said container for yieldably engaging and retaining any one or more of said microfiche films in raised predetermined position, after the same has been raised above the other films in said container by said film lifting means.

5. Microfiche film, and a storage and retrieval unit therefor comprising, an elongated longitudinally movable container having a longitudinal axis and transversely partitioned in closely spaced parallel relation, substantially throughout the length thereof, to form closely spaced parallel film receiving spaces between said partitions to snugly receive, support, and store microfiche film sheets therein in identical flat and oriented similar positions in parallel closely spaced flat planes normal to the longitudinal axis of said movable container, a relatively fixed reading head extending under said container to be traversed by longitudinal movement of said container, said container having an open bottom with inturned flange means at each side thereof for supporting the said microfiche films in said film receiving spaces by the opposite side edges thereof, to leave the bottom edges of said films between the inturned flanges exposed to said reading head through the bottom of the container, solenoid film lifter means disposed in fixed relation to said reading head under said container having a solenoid core movable upwardly toward the bottom edges of said films when energized, a thin film lifter blade fixed to the upper end of said core for engagement with the bottom edge of any selected film, intermediate the sides of its film receiving and storing space, when said film is positioned directly above the center of said solenoid film lifter means, said solenoid film lifter means having a predetermined upward movement when energized to engage and raise said film in its receiving and storing space above the other films in said container, friction means in said container for yieldably engaging and retaining said film elevated in said container when raised by said lifting means, to prevent the selected film from dropping downward by gravity in its film receiving space when said solenoid core of said solenoid means is retracted, means for retracting said core downwardly out of the way when said solenoid is de-energized, photocell energizing means, said films have photocell solenoid control means disposed in predetermined different longitudinally spaced relations along the edges thereof and selectively cooperating photocell illumination reading means similarly disposed in said reading head for cooperative energizing relation with said longitudinally spaced photocell control means on said edges of said films, for energizing said solenoid film lifter means upon said cooperative registration thereof, when the bottom edge of said film is disposed directly above said solenoid lifter means.

6. A microfiche film storage and retrieval unit as set forth in claim 5, in which the bottom edge of each of the films is similarly beveled with short flat unbeveled portions thereon located in different predetermined longitudinal positions between the sides of the film for aligned registration with correspondingly located cooperating solenoid film lifter circuit closing means in said reading head, switch means for selectively conditioning the closing of a predetermined solenoid energizing circuit through one or more of said predetermined film lifter solenoid energizing means when the bottom edge of a selected predetermined film is moved directly over the center of said solenoid film lifter means, to energize said lifter solenoid means to raise the top edge portion of that selected film in its film receiving space in said container above the top edges of the other films in the container that are not selected or raised.

7. A microfiche film receiving, storage, and selective retrieval unit as set forth in claim 6 in which, said longitudinally spaced short flat unbeveled portions on the beveled edges of the microfiche films are highly reflective and normal to the planes of the films, said reading head including photo-electric-photo-cell circuit closing means for energizing said solenoid film lifter means comprising, light beam projecting means in said reading head for projecting concentrated light rays at an inclined angle toward said flat highly reflective portions of said films in said container, located in said spaced parallel vertical planes normal to the planes of the films, during longitudinal movement of said container and films therein above said reading head, for reflecting said concentrated light rays striking said short flat reflective portions at the angle of incidence in the opposite directions in said planes normal to the planes of the films in the container when said short flat reflective edge portions of the films are moved by said container into positions directly above said film lifter blade means, to selectively reflect the light rays at said angle of incidence from said short reflective flat surfaces, in the aforesaid planes through said flat surfaces normal to the planes of said films, photo-electric-photo-cell circuit closing means fixed in said reading head in each of said planes through said reflective surfaces, to be energized by the reflected light beams from each of said reflective surfaces, and energizing circuits connected between said photo-electric-photo-cell circuit closing means and said film lifter solenoid means including selective switch means for selectively conditioning predetermined photo cells for predetermined solenoid film lifter circuits for circuit closing relation with said film lifter solenoid means when one or more of said conditioned photocells are energized by a reflected light beam or beams from one or more of said cooperative flat reflective surfaces on the edges of said films.

8. Apparatus as set forth in claim 7 in which said edge portions of said films located between the flat light ray reflective portions thereof are beveled at substantially the same angle, relative to the planes of the films, of said concentrated projected light rays or beams, to prevent the reflection of said light rays or beams by said beveled edge portions of those films from reaching the photocells which are located in the planes passing through the short reflective edge portions of those films normal to the planes of those films.

References Cited

UNITED STATES PATENTS

| | | | |
|---|---|---|---|
| 2,931,916 | 4/1960 | Sinn | 250—219 |
| 3,034,512 | 5/1962 | Hunter | 129—16.1 |
| 3,339,849 | 9/1967 | Paulus | 129—16.1 |
| 3,351,743 | 11/1967 | Jordan | 250—219 |

RALPH G. NILSON, Primary Examiner

M. ABRAMSON, Assistant Examiner

U.S. Cl. X.R.

129—16.1